(12) United States Patent
Feinberg et al.

(10) Patent No.: US 7,711,549 B2
(45) Date of Patent: May 4, 2010

(54) MULTI-LANGUAGE JUMP BAR SYSTEM AND METHODS

(75) Inventors: Yaniv Feinberg, Redmond, WA (US); Antonio Alwan, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1652 days.

(21) Appl. No.: 10/779,837

(22) Filed: Feb. 17, 2004

(65) Prior Publication Data

US 2005/0182766 A1 Aug. 18, 2005

(51) Int. Cl.
*G06F 17/20* (2006.01)
(52) U.S. Cl. .................. 704/8; 704/1; 704/2; 704/3; 704/9; 704/10; 715/254; 715/264; 707/2; 707/3; 707/6
(58) Field of Classification Search ............ 704/1, 704/2, 3, 8–10; 707/2, 3, 6; 715/254, 264
See application file for complete search history.

(56) References Cited

U.S. PATENT DOCUMENTS

| | | | | |
|---|---|---|---|---|
| 5,079,702 | A * | 1/1992 | Ho | 715/264 |
| 5,378,068 | A * | 1/1995 | Hua | 400/110 |
| 5,959,629 | A * | 9/1999 | Masui | 715/808 |
| 6,292,770 | B1 * | 9/2001 | Zerber | 704/8 |
| 7,194,404 | B1 * | 3/2007 | Babst et al. | 704/9 |
| 2003/0233340 | A1 * | 12/2003 | Flasza et al. | 707/1 |
| 2004/0148351 | A1 * | 7/2004 | Cotte | 709/205 |
| 2004/0176944 | A1 * | 9/2004 | Noda et al. | 704/3 |
| 2004/0181776 | A1 * | 9/2004 | Atkin et al. | 717/111 |
| 2005/0198023 | A1 * | 9/2005 | James et al. | 707/4 |
| 2006/0277213 | A1 * | 12/2006 | Robertson et al. | 707/102 |
| 2007/0156394 | A1 * | 7/2007 | Banerjee et al. | 704/10 |

* cited by examiner

*Primary Examiner*—David R Hudspeth
*Assistant Examiner*—Lamont M Spooner
(74) *Attorney, Agent, or Firm*—Merchant & Gould P.C.

(57) ABSTRACT

A multi-language jump bar system and methods for use in connection with a multi-language contact management computer software program. The jump bar system includes a plurality of user-selectable buttons which may be associated with alphanumeric characters from different languages through use of a character set in which each alphanumeric character is identified by a single, unique, numeric character code. The buttons enable rapid updating of displayed contact information from a contacts information database simultaneously storing contact information in multiple languages so that a user of the contact management computer software may more quickly locate contact information for a particular contact. A jump bar method enables assignment of character codes to buttons according to weights associated with each character code. Such weights may be based at least partially on the usage frequency of the alphanumeric characters associated with the character codes in their respective languages.

20 Claims, 6 Drawing Sheets

MULTI-LANGUAGE JUMP BAR SYSTEM AND METHODS

TECHNICAL FIELD

The present invention relates, generally, to the field of contact management computer software and, more specifically, to jump bar systems and methods for multi-language contact management computer software that aid in the rapid location of desired contact information.

BACKGROUND OF THE INVENTION

Today's contact management computer software programs allow their users to input, edit, store and retrieve information associated with business and/or personal contacts. Generally, for each contact, the information comprises a plurality of data elements which are representative of the contact's name, title, company name, business address, home address, electronic mail addresses, and one or more telephone numbers associated with business telephones, business facsimile devices, home telephones, home facsimile devices, and wireless telephones. Each data element, typically, includes a plurality of alphanumeric characters or symbols that are stored and retrieved from a database or data file employed by the contact management program.

In order to enable their international use, the contact management computer software programs may enable their users to select one or more languages that will be used by the programs for the input, editing, storage and retrieval of the information associated with contacts (i.e., the contact information). For those contact management programs that operate under present and older versions of the Microsoft® Windows® environment, each language is uniquely represented by a code page having a system-wide code page number setting which is established and stored during setup of the Microsoft® Windows® environment. Within each code page, each alphanumeric character or symbol of the selected language is represented by a code number. As a consequence, the same alphanumeric character in different languages might be represented by different code numbers, thereby requiring those contact management programs operating under present or older versions of the Microsoft® Windows® environment to utilize and consider both the code page number and code number of each alphanumeric character when manipulating, storing and retrieving data elements and their alphanumeric characters if such programs enable the simultaneous management of contacts using a plurality of languages. Because the use and consideration of both the code page number and code number necessarily requires more memory, storage space and processing power, such contact management computer software programs, typically, allow the management of contact information using only one language at a time and not the simultaneous use of more than one language.

The necessary use and consideration of both the code page number and code number for each alphanumeric character also makes more difficult the implementation and operation of "jump bars" that some contact management programs utilize to enable their users to more quickly locate contact information associated with a particular contact. Such "jump bars", or "button bars", include a plurality of user-selectable buttons with each button being labeled and associated with a range of alphanumeric characters. Upon selection of a button by a user, such contact management programs retrieve and display the contact information for contacts starting with those contacts having a last name that begins with the first alphanumeric character of the range of alphanumeric characters associated with the button. If the simultaneous use of multiple languages is permitted, the range of alphanumeric characters associated with each button must include both code page numbers and code numbers for such characters and the contact management program must make use of both the code page number and code numbers when attempting to retrieve and display desired contact information.

Therefore, there exists in the industry, a need for jump bar systems and methods for multi-language contact managers that enable users to quickly locate and/or jump to desired contact information, and that addresses these and other problems or difficulties which exist now or in the future.

SUMMARY OF THE INVENTION

Broadly described, the present invention comprises a jump bar system for use with contact management computer software that is capable of simultaneously supporting multiple languages. More particularly, the present invention comprises a jump bar system, including apparatuses and methods, having a plurality of user-selectable buttons which may be associated with alphanumeric characters from different languages through use of a character set in which each alphanumeric character is identified by a unique numeric character code. The buttons enable rapid updating of displayed contact information from a contacts information database simultaneously storing contact information in multiple languages so that a user of contact management computer software may more quickly locate contact information for a particular contact. Importantly, the numeric character codes associated with the alphanumeric characters of each language are arranged in contiguous blocks, or ranges of codes, so that once the character code of an alphanumeric character is known, the language to which that alphanumeric character belongs is also known. Additionally, the character codes of respective alphanumeric characters are assigned to the buttons in accordance with weights associated with each character code. The weights may be based at least partially on the usage frequency of the alphanumeric characters in their respective languages.

Advantageously, the jump bar system of the present invention provides significant benefits for both contact management computer software vendors and users thereof. From the vendors' perspective, the present invention's use of a character set having a single, unique, numeric character code for each alphanumeric character of each language supported by the character set in lieu of the character sets requiring the use of code page numbers and code numbers to uniquely identify each alphanumeric character that were used in previous jump bar systems, reduces the complexity, memory, storage space and processing requirements of the jump bar system and the associated contact management computer software. From the users perspective, the present invention's use of a character set having a single, unique, numeric character code for each alphanumeric character of multiple languages allows the input, editing, storage, retrieval, and rapid location of contact information using languages appropriate for such contact information and enables users to utilize the same contacts information database for storing contact information for all of their contacts instead of potentially having to use different databases to store contact information that is stored in respectively different languages. Also, by making use of a character set having such unique, numeric character codes arranged in blocks, or ranges of character codes, for each supported language, contacts having contact information in a particular language are grouped together when displayed, thereby enabling more rapid location of the contact information for a desired contact.

Other advantages and benefits of the present invention will become apparent upon reading and understanding the present specification when taken in conjunction with the appended drawings.

DETAILED DESCRIPTION OF THE INVENTION

Figure 1:
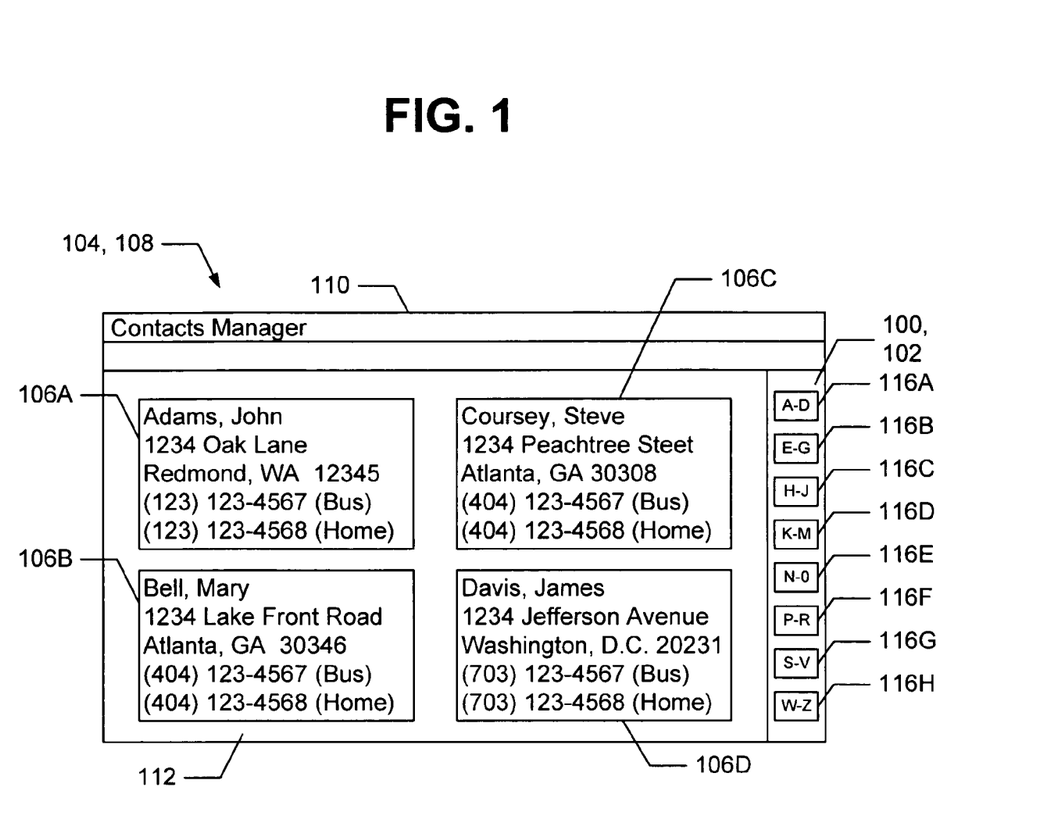
FIG. 1 displays a pictorial representation of a jump bar of the present invention integrated with a contact manager graphical user interface in accordance with an exemplary embodiment described herein.

Referring now the drawings in which like numerals represent like elements or steps throughout the several views, FIG. 1 displays a pictorial representation of a jump bar graphical user interface 100 of a jump bar system 102, in accordance with an exemplary embodiment of the present invention, which is integrated into a contact management computer software program 104 (also sometimes referred to herein as a "contact manager 104" or as a "contact management program 104"). The contact manager 104 enables a user thereof to input, edit, store and retrieve contact information 106 associated with a desired contact and comprises a contact manager graphical user interface 108 having a window 110 with a contact display pane 112 in which contact information 106 for a plurality of contacts may be displayed by the contract manager 104. The contract manager 104 further comprises a contacts information database 114 which stores contact information 106 for the plurality of contacts and from which contact information 106 is retrieved by the jump bar system 102 of the present invention for display in the contact display pane 112.

The jump bar system 102 aids a user of the contact manager 104 in rapidly locating contact information 106 associated with a desired contact that has been previously stored in a database 114. The jump bar graphical user interface 100 (also sometimes referred to herein as the "jump bar 100") of the jump bar system 102 comprises a plurality of buttons 116 which are selectable by a user via a computer mouse, other pointing device, or keyboard command. The specific number of buttons 116 which appear on the jump bar 100 is dependent on the size of the window 110 of the contact manager graphical user interface 108 and, therefore, may change if a user of the contact manager re-sizes the window 110. As a consequence, the specific number of buttons 116 present on the jump bar 100 at two different particular times may be different, with the jump bar 100 potentially including a greater or lesser number of buttons 116 at each time.

Each button 116 of the jump bar 100 is, preferably, associated and labeled with first and second alphanumeric characters that are displayed as a range of alphanumeric characters thereon as illustrated in FIG. 1. For example and not limitation, in FIG. 1, the first alphanumeric character associated with button 116A is the letter "A" and the second alphanumeric character associated with button 116A is the letter "D". Importantly, the first and second alphanumeric characters are each represented by unique numeric character codes of a character set which includes numeric character codes for multiple languages. The numeric character codes of the character set are employed by the contact manager 104 to display and store contact information 106 in the contact information database 114 and, by the methods 400, 600 described below, to enable a user to cause updating of the display of contact information 106 from the database 114 in the contact display pane 112. Preferably, the character set comprises a character set which includes numeric character codes uniquely associated with alphanumeric characters of multiple languages such that the numeric character codes corresponding to alphanumeric characters of each language are arranged in numerically contiguous blocks or ranges. By virtue of the arrangement of numeric character codes in numerically contiguous ranges corresponding to different languages, the numeric character code of each alphanumeric character not only uniquely identifies the alphanumeric character, but also identifies the language to which the alphanumeric character belongs as the numeric character code of the alphanumeric character lies within the pre-defined range of numeric character codes associated with the character's language. A character set, acceptable in accordance with the exemplary embodiment described herein, includes the Unicode character set.

Notably, because the jump bar system 102 of the present invention employs and utilizes such a character set, the first and second alphanumeric characters associated with each button 116 of the jump bar 100 may each have character codes associated with the same or different languages. Also notably, the first alphanumeric character defines the alphanumeric character that is used, by method 600 described below, as a starting alphanumeric character for the display of contact information 106 in contact display pane 112. More specifically, when a button 116 is selected from the jump bar 100 by a user, the starting alphanumeric character of the selected button 116 is used by method 600 to update the contact information 106 displayed in the contact display pane 112 with contact information 106 from the contact information database 114 which is associated with contacts having a last name that begins with an alphanumeric character having a character code with a numeric value equal to or greater than the numeric value of the character code of the starting alphanumeric character of the selected button 116.

Figure 2:
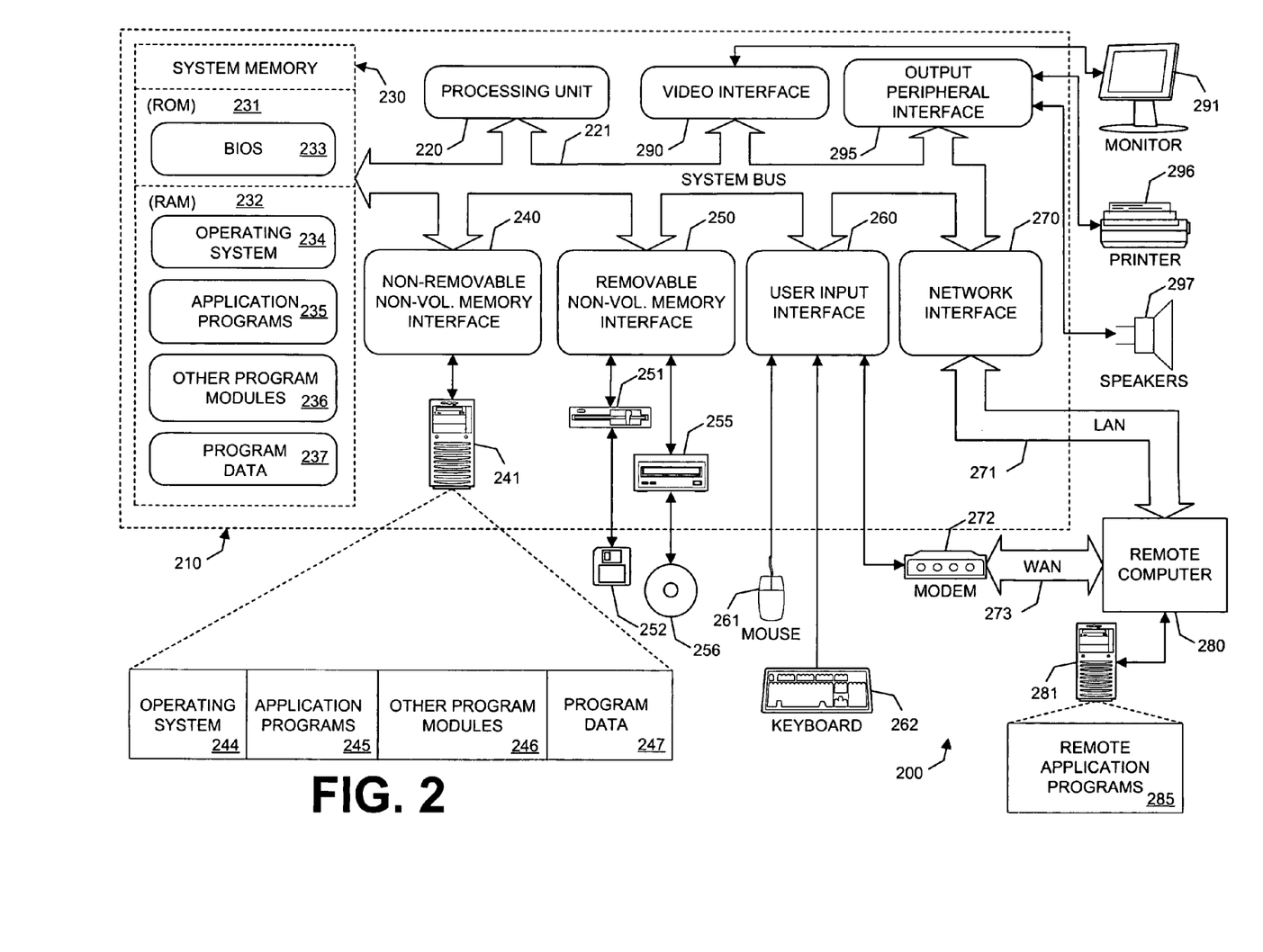
FIG. 2 displays a block diagram representation of hardware components of a computer system and environment therefor which may be utilized to implement the jump bar systems and methods of the present invention.

FIG. 2 displays a block diagram representation of a computing environment 200 and computer systems 210, 280 thereof which the jump bar system 102 of the present invention may utilize in accordance with the embodiment described herein. The computing environment 200 and computer systems 210, 280 thereof represent only one example of a suitable computing environment and computer systems for the practice of the present invention and are not intended to suggest any limitation as to the scope of use or functionality of the invention. Nor should the computer systems 210, 280 be interpreted as having any dependency or requirement relating to any one or combination of components illustrated in the exemplary computing environment 200.

Hence, it should be understood that the jump bar system 102 of the present invention is operational with numerous other general purpose or special purpose computing system environments or configurations. Examples of well-known computing systems, environments, and/or configurations that may be appropriate or suitable for use as computer systems of the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The jump bar system 102 of the present invention may also be described in the general context of comprising computer-executable instructions, such as program modules, being executed by a computer system. Generally, program modules include routines, programs, programming, objects, components, data, data structures, and other elements that perform particular tasks or implement particular abstract data types. The jump bar system 102 of the present invention may be practiced in distributed computing environments where tasks are performed by remote processing devices that are linked through a communications network. In a distributed computing environment, program modules may be located in both local and remote computer storage media, including, without limitation, in memory storage devices.

With reference to FIG. 2, exemplary computer systems of the jump bar system 102 of the present invention include general purpose computing devices in the form of a computer system 210. Components of computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as the "Mezzanine bus").

Computer system 210, preferably, includes a variety of computer-readable media. Computer-readable media may comprise any available media that can be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which can be used to store the desired information and which can be accessed by computer system 210. Communication media typically embodies computer-readable instructions, data, data structures, program modules, programs, programming, or routines in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bi-directional communication link between the computers may be used.

Figure 3:
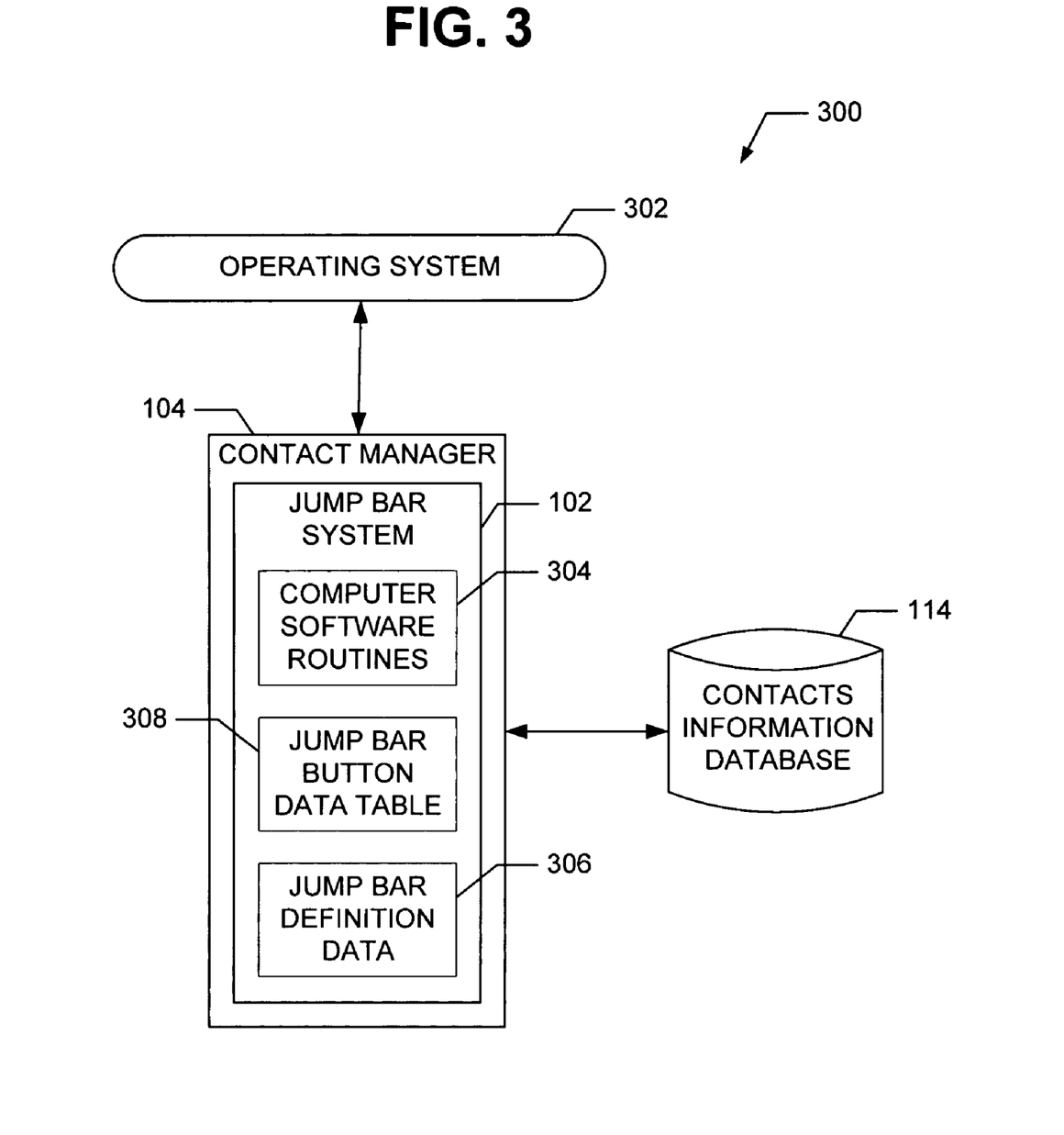
FIG. 3 displays a block diagram representation of a computer software domain of the jump bar system of the present invention in accordance with the exemplary embodiment described herein.

FIG. 3 displays a block diagram representation of a computer software domain 300 of the jump bar system 102 in accordance with the embodiment of the present invention described herein and as integrated with a contact manager 104, a contacts information database 114, and an operating system 302. The jump bar system 102, preferably, comprises a plurality of computer software routines 304 (also sometimes referred to herein as "computer software functions 304"), jump bar definition data 306 for the jump bar graphical user interface 100, and a jump bar button data table 308 which, preferably, reside and are stored in the non-volatile memory or computer storage media of a computer system such as computer system 210. The operating system 302 includes a plurality of computer executable software instructions which, when executed by a computing system's processing unit, enables the computing system to perform basic functions necessary for the overall management and control of the computing system's operation. Such basic functions, preferably, include managing and causing the execution of computer software routines 306, enabling the storage and retrieval of data from data files and/or databases, and directing the communication of data between processes and/or with a communication network. An operating system 302, acceptable in accordance with the embodiment of the present invention described herein, is Microsoft® Windows XP available from Microsoft Corporation of Redmond, Wash. Similarly, each computer software routine 306 includes a plurality of computer executable software instructions. However, when such computer executable software instructions are executed by a computing system's processing unit, the instructions cause the computing system to implement the various methods 400, 600 of the present invention by performing various functions.

The definition data 306 comprises data which defines the appearance of the jump bar graphical user interface 100 in the window 110 of the contact manager graphical user interface 108 and also defines various parameters necessary for the operation of the jump bar graphical user interface 100 and the buttons 116 thereof. It should be noted that the definition data 306 may be integrated into and be a part of similar definition data for the contact manager graphical user interface 108.

The jump bar button data table 308 comprises a data table arranged in a row and column format which stores, in each row thereof, a character code of an alphanumeric character which may be associated with a button 116 as a first alphanumeric character (described above) and a character weight corresponding to the character code. Each character weight comprises a numeric value that identifies a rank of the corresponding character code relative to the other character codes present in other rows of the jump bar button data table 308. The rank is employed, as described below with respect to method 600, to determine which alphanumeric characters are to be associated with buttons 116 as first alphanumeric characters when a user re-sizes the window 110 of the contact manager graphical user interface 108 (i.e., since re-sizing of the window 110 may cause the jump bar 100 to have a greater or lesser number of buttons 116 available for use and all of the alphanumeric characters of the multi-language character set cannot be associated as a first alphanumeric character of a button 116). Generally, those alphanumeric characters having a higher numerical weight, or rank, are assigned to and associated with the limited number of buttons 116 as first alphanumeric characters, while those having a lower numerical weight, or rank, are not. Alternatively, those alphanumeric characters having a lower numerical weight, or rank, are assigned to and associated with the limited number of buttons 116 as first alphanumeric characters, while those having a higher numerical weight, or rank, are not. Obviously, many methods of assigning and associating alphanumeric characters with the buttons 116 of the jump bar 100 may be employed by the jump bar system 102. Therefore, it should be understood that the scope of the present invention includes all such other methods of assigning and associating alphanumeric characters with the buttons 116 of the jump bar 100 that may be contemplated now or in the future.

Figure 4:
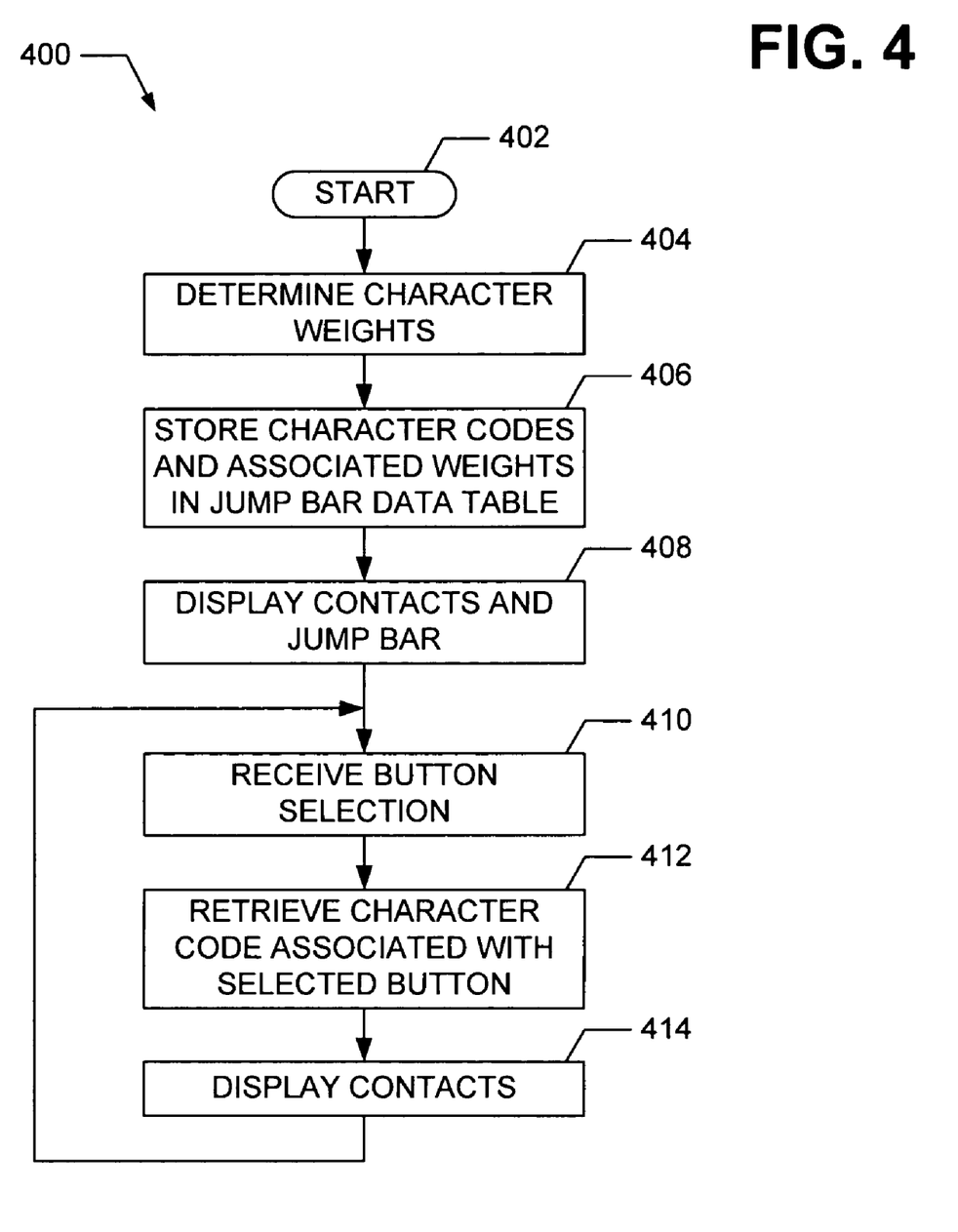
FIG. 4 displays a flowchart representation of a method of operating the jump bar system of the present invention in accordance with the exemplary embodiment described herein.

FIG. 4 displays a flowchart representation of a method 400 of operating the jump bar system 102 of the present invention to update the contact display pane 112 of the contact manager graphical user interface 108 with contact information 106 retrieved from the contacts information database 114. After starting at step 402, the character weights of the alphanumeric characters to be displayed on the buttons 116 of the jump bar 100 are determined at step 404. If the jump bar 100 and contact manager 104 are to be utilized with one or more languages, the determination may be made by evaluating the usage frequency of each of the alphanumeric characters of such languages and by assigning a character weight to each alphanumeric character based upon the relationship of the usage frequency of each alphanumeric character to the usage frequency of the other alphanumeric characters. Preferably, each character weight is within a range having a minimum numeric value of zero and a maximum numeric value of ten, with: (i) those alphanumeric characters having the highest usage frequency being assigned the maximum numeric value; (ii) those alphanumeric characters having the lowest usage frequency being assigned the minimum numeric value; and, (iii) those alphanumeric characters having a usage frequency between the highest and lowest usage frequency being assigned a numeric value between the maximum and minimum numeric values in relative proportion to the usage frequency's relationship to the highest and lowest usage frequency.

Once the character weights of the alphanumeric characters have been determined, those alphanumeric characters having the highest character weight numeric values are selected and their character codes and associated character weights are stored, at step 406, in the jump bar button data table 308 with each row of the jump bar button data table 308 including the character code and associated character weight of a selected alphanumeric character. Preferably, the jump bar button data table 308 includes a number of rows and, hence, the character codes and associated character weights for a plurality of alphanumeric characters, equal to the maximum number of buttons 116 that may be displayed in the jump bar 100. Importantly, because each character code may represent an alphanumeric character associated with a different language, each button 116 of the jump bar 100 may be associated with first and second alphanumeric characters of different languages.

Next, at step 408 of method 400, contact information 106 for a plurality of contacts is selected and retrieved from the contacts information database 114 and then displayed in the contacts display pane 112 of the contact manager graphical user interface 108. Preferably, the displayed contact information 106 is selected from the contacts information database 114 starting with the contact having a last name beginning with an alphanumeric character having the lowest numeric character code of all contacts in the contacts information database 114 and proceeding to select subsequent contact information 106 for contacts having last names beginning with alphanumeric characters having increasingly higher numeric character codes. Due to such selection of contact information 106 and because the character codes of each language of the character set fall within a range of character codes associated with each such language, the contact information 106 is displayed in increasing alphabetic order with the contact information 106 for contacts having last names formed from alphanumeric characters of each language being grouped together.

Additionally at step 408, the number of buttons 116 that may be displayed in the jump bar 100 is determined based at least in part on the size of the window 110 of the contact manager graphical user interface 108. Once the number of displayable buttons 116 has been determined, first alphanumeric characters are assigned to each displayed button 116 by selecting a number of character codes from the jump bar button data table 308 equal to the number of displayable buttons 116. The selected character codes are, preferably, those character codes having the highest character weights. The selected character codes are then sorted, or ordered, in ascending numerical order such that the selected character code having the lowest numerical value is the first character code of the sorted character codes. The first character code of the sorted character codes is associated with the first button 116A and is assigned as the first alphanumeric character for the first button 116A. The character code having a numeric value immediately less than that of the second character code of the sorted character codes is assigned as the second alphanumeric character for the first button 116A. The second character code of the sorted character codes is then associated with the second button 116B and is assigned as the first alphanumeric character for the second button 116B. The character code having a numeric value immediately less than that of the third character code of the sorted character codes is assigned as the second alphanumeric character for the second button 116B. Similarly, the remainder of the sorted character codes are associated with the remainder of the displayable buttons 116, and first and second alphanumeric characters are assigned to the remainder of the displayable buttons 116.

Continuing in accordance with method 400, the selection of a button 116 of the jump bar 100 is received from a user at step 410 and the character code of the first alphanumeric character assigned to the selected button 116 is retrieved, at step 412, for use in updating the contact information 106 displayed in the contacts display pane 112 of the contact manager graphical user interface 108. Next, at step 414, the contacts display pane 112 is updated by retrieving and displaying contact information 106 from the contacts information database 114 starting with the first contact having a last name that begins with an alphanumeric character having a numeric character code equal to or greater than the retrieved character code of the first alphanumeric character assigned to the selected button 116. Once the contact information 106 for the first contact is retrieved and displayed in the contacts display pane 112, contact information 106 for contacts having last names that begin with alphanumeric characters having numeric character codes that are equal to or greater than the numeric character code of the first character of the first contact's last name is retrieved and displayed in alphabetic order by last name until the contacts display pane 112 has been populated with contact information 106. After the contacts display pane 112 has been fully populated with contact information 106, the method 400 loops back to step 410 to receive another button 116 selection.

Figure 5:
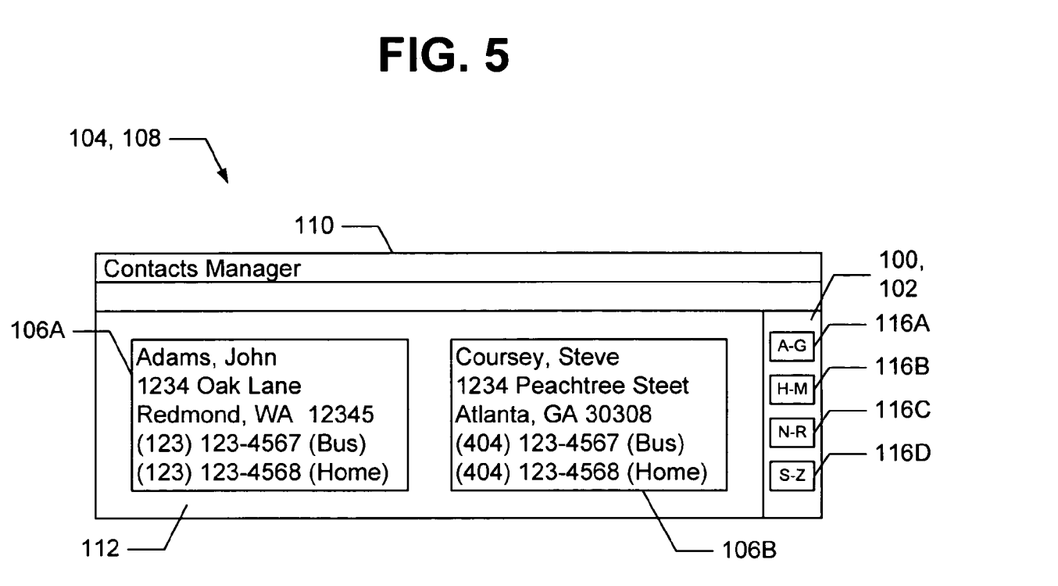
FIG. 5 displays a pictorial representation of a re-sized jump bar of the present invention integrated with a contact manager graphical user interface in accordance with the exemplary embodiment described herein.

During use of the contact manager 104, the user may re-size the window 110 of the contact manager graphical user interface 108 and, hence, may also re-size the jump bar 100. FIG. 5 displays a pictorial representation of the contact manager graphical user interface 108 of FIG. 1 after re-sizing to a smaller size by a user. Notably, the number of buttons 116 that are displayed on the jump bar 100 has been reduced in concert with the reduced size of the window 110. As a consequence, some of the buttons 116 that were formerly displayed on the jump bar 100 are no longer displayed and, hence, a user cannot select those buttons 116 to rapidly update the contacts display pane 112 to display contact information 106 for contacts having last names that begin with the first alphanumeric characters associated with and assigned to the non-displayed buttons 116. Therefore, it is necessary to re-associate and re-assign first and second alphanumeric characters to the buttons 116 that are still displayed after re-sizing.

Figure 6:
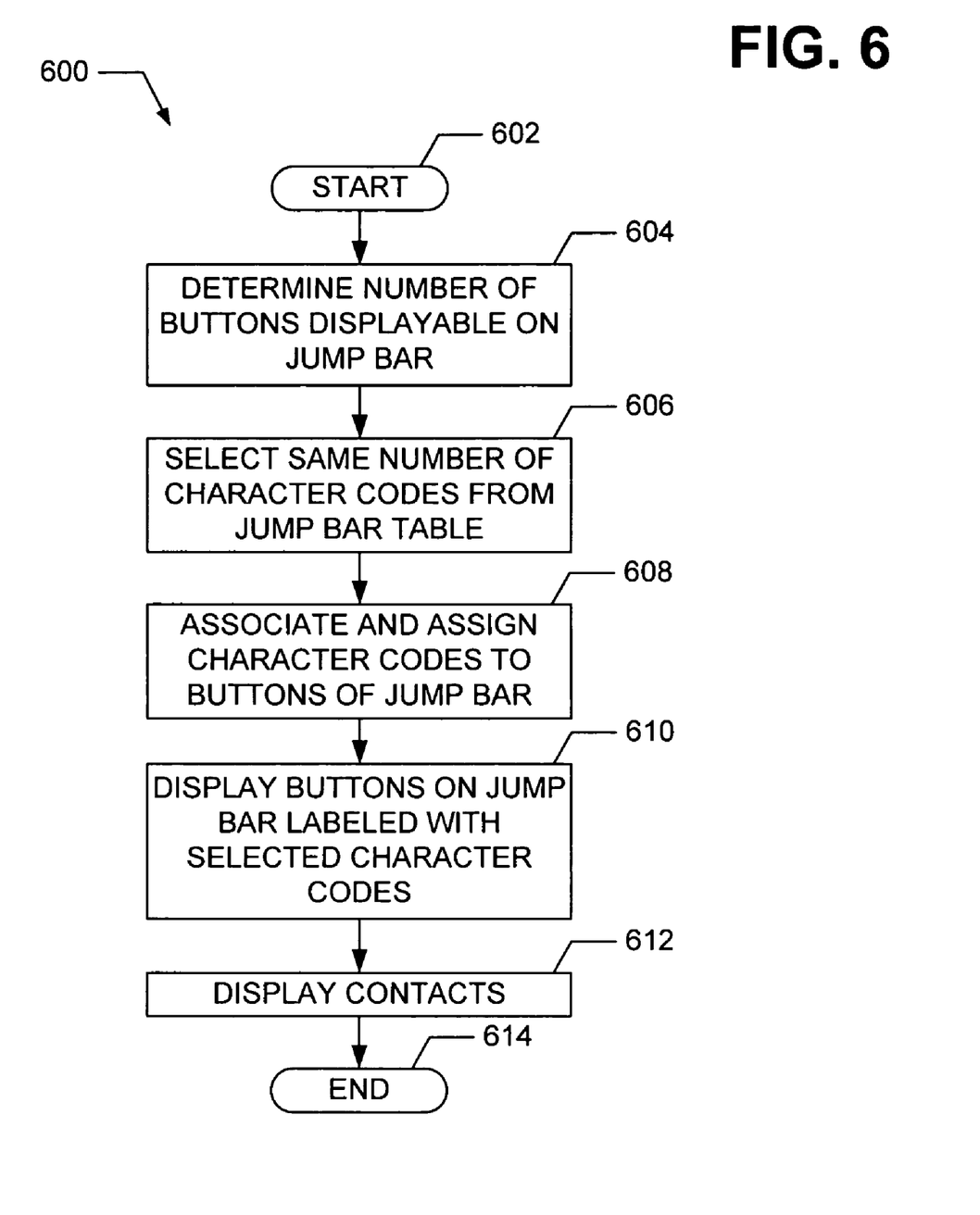
FIG. 6 displays a flowchart representation of a method of operating the jump bar system of the present invention in response to re-sizing of the jump bar thereof.

FIG. 6 displays a flowchart representation of a method 600 of operating the jump bar system 102 of the present invention in response to re-sizing of the jump bar 100 thereof according to the exemplary embodiment described herein. After starting at step 602, the method 600 advances to step 604 where the number of buttons 116 that are displayable on the jump bar 100 is determined. Generally, the determination is made based at least partially on geometrical considerations (i.e., how many buttons 116 of a desired size fit within the horizontal and vertical boundaries of the jump bar 100).

Once the number of displayable buttons 116 has been determined, a number of character codes from the jump bar button data table 308 equal to the number of displayable buttons 116 are selected at step 606. Preferably, the selected character codes are those character codes having the highest character weights. Next, at step 608, each selected character code is associated with and assigned to a displayable button 116 as a first alphanumeric character therefor. Association and assignment of the selected character codes may be, generally, accomplished by sorting, or ordering, the selected character codes in ascending numerical order such that the selected character code having the lowest numerical value is the first character code of the sorted character codes. The first character code of the sorted character codes is associated with the first displayable button 116A and is assigned as the first alphanumeric character for the first displayable button 116A. The character code having a numeric value immediately less than that of the second character code of the sorted character codes is assigned as the second alphanumeric character for the first displayable button 116A. The second character code of the sorted character codes is then associated with the second displayable button 116B and is assigned as the first alphanumeric character for the second displayable button 116B. The character code having a numeric value immediately less than that of the third character code of the sorted character codes is assigned as the second alphanumeric character for the second displayable button 116B. Similarly, the remainder of the sorted character codes are associated with the remainder of the displayable buttons 116, and first and second alphanumeric characters are assigned to the remainder of the displayable buttons 116.

Continuing at step 610 of method 600, the displayable buttons 116 are displayed on the jump bar 100 with the first and second alphanumeric characters associated with and assigned to each button 116 being displayed atop thereof as a button label. For example and not limitation, the first and second alphanumeric characters associated with and assigned to button 116A are the letters "A" and "G". Thus, when the first button 116A is displayed on the jump bar 100, it is displayed with the label "A-G" to indicate that if a user desires to quickly update the contacts display pane 112 of window 110 with the contact information 106 of contacts having last names starting with a letter between, or in the range of, "A" and "G", the user should select button 116A.

After the displayable buttons 116 have been displayed on the jump bar 100, contact information 106 associated with respective contacts is retrieved from the contacts information database 114 and is displayed in the contacts display pane 112 of window 110 at step 612. Generally, the displayed contact information 106 is selected from the contacts information database 114 starting with the contact having a last name beginning with an alphanumeric character having the lowest numeric character code of all contacts in the contacts information database 114 and proceeding to select subsequent contact information 106 for contacts having last names beginning with alphanumeric characters having increasingly higher numeric character codes. Because the contact information 106 is selected in order of last names beginning with alphanumeric characters having increasingly higher numeric character codes and because the character codes of each language of the multi-language character set employed by the jump bar 100 fall within a range of character codes associated with each such language, the contact information 106 is displayed in increasing alphabetic order with the contact information 106 for contacts having last names formed from alphanumeric characters of each language being grouped together. Once the contacts display pane 112 has been updated with contact information 116, operation of the jump bar 100 in accordance with method 600 ends at step 614.

Whereas the present invention has been described in detail above with respect to an exemplary embodiment thereof, it is understood that variations and modifications can be effected within the spirit and scope of the invention, as described herein before and as defined in the appended claims.

What is claimed is:

1. A method of operating a jump bar of a contact manager, comprising the steps of:

assigning a character code to a displayed button of the jump bar, the jump bar comprising a plurality of buttons, wherein the character code is uniquely associated with an alphanumeric character of a character set having a single character code uniquely associated with each alphanumeric character of a plurality of alphanumeric characters from a plurality of languages, wherein the jump bar comprises a button data table including a plurality of rows comprising at least a plurality of character codes for the plurality of alphanumeric characters, wherein each of the plurality of character codes represents an alphanumeric character associated with a different language, the plurality of rows equal to a maximum number of buttons displayable in the jump bar, wherein each button of the plurality of buttons of the jump bar is associated with two alphanumeric characters of a first language and simultaneously associated with two alphanumeric characters of at least a second language, wherein the first language is different from the second language, wherein each of the plurality of character codes represents an alphanumeric character associated with a different language, and wherein the plurality of character codes are arranged as respectively contiguous ranges of numbers to enable the identification of a language to which an alphanumeric character belongs upon the identification of one of the plurality of character codes representing the alphanumeric character;

retrieving contact information from a contacts information database by comparing the assigned character code and the first alphanumeric character of the last names of contacts having associated contact information previously stored in the contacts information database; and displaying the retrieved contact information in a window of the contact manager.

2. The method of claim 1, wherein the method further comprises a step of selecting the character code assigned to the button of the jump bar based at least in part upon a usage frequency of the associated alphanumeric character in the respective language thereof.

3. The method of claim 1, wherein the method further comprises a step of determining respective weights for the alphanumeric characters of the plurality of alphanumeric characters.

4. The method of claim 1, wherein the step of displaying the retrieved contact information includes displaying retrieved contact information in groups corresponding to the languages of the retrieved contact information.

5. The method of claim 1, wherein the assigned character code is a first character code and the button is a first button of the jump bar, wherein the first character code is associated with a first language, and wherein the method further comprises a step of assigning a second character code associated with a second language to a second button of the jump bar.

6. The method of claim 1, wherein the assigned character code is a first character code associated with a first language, and wherein the method further comprises a step of assigning a second character code associated with a second language to the button of the jump bar.

7. The method of claim 1, wherein the plurality of languages includes an Indic language.

8. The method of claim 1, wherein the character code is a first character code, and wherein the method further comprises a step of assigning a second character code to the button of the jump bar in response to re-sizing of the window of the contact manager by a user.

9. The method of claim 8, wherein the first character code has a first numeric value, wherein the second character code has a second numeric value, and wherein the second numeric value is numerically greater than the first numeric value.

10. A jump bar system, comprising:
a plurality of buttons displayable in a graphical user interface window of a contact manager, wherein each button is associated uniquely with a character code corresponding to an alphanumeric character of a character set having a single character code uniquely associated with each alphanumeric character of a plurality of languages;
a button data table including a character code and associated weight for each of a plurality of alphanumeric characters that are assignable to the buttons of the plurality of buttons, wherein the button data table includes a plurality of rows comprising the character code and the associated weight for each of the plurality of alphanumeric characters, wherein each of the character codes associated with the plurality of buttons represents an alphanumeric character associated with a different language, the plurality of rows equal to a maximum number of the plurality of buttons displayable in the graphical user interface window of the contact manager, wherein each of the plurality of buttons is associated with two alphanumeric characters of a first language and simultaneously associated with two alphanumeric characters of at least a second language, wherein the first language is different from the second language, wherein each of the plurality of character codes represents an alphanumeric character associated with a different language, and wherein the plurality of character codes are arranged as respectively contiguous ranges of numbers to enable the identification of a language to which an alphanumeric character belongs upon the identification of one of the plurality of character codes representing the alphanumeric character; and
a computer software routine including a plurality of executable instructions, said computer software routine being operable to uniquely associate buttons of said plurality of buttons with character codes corresponding to alphanumeric characters of said character set.

11. The jump bar system of claim 10, wherein said computer software routine is further operable to update said graphical user interface window of said contact manager with contact information.

12. The jump bar system of claim 10, wherein said weight for each of said plurality of alphanumeric characters is based at least in part on a usage frequency of each said alphanumeric character within the language thereof.

13. The jump bar system of claim 10, wherein said computer software routine is operable to uniquely associate a character code of a first alphanumeric character of a first language with a first button of said plurality of buttons and to uniquely associate a character code of a second alphanumeric character of a second language with a second button of said plurality of buttons.

14. The jump bar system of claim 10, wherein said computer software routine is operable to uniquely associate a character code of a first alphanumeric character of a first language with a button of said plurality of buttons and to uniquely associate a character code of a second alphanumeric character of a second language with said button of said plurality of buttons.

15. The jump bar system of claim 10, wherein said plurality of languages include at least one Indic language.

16. A method of operating a jump bar of a contact manager, comprising the steps of:
associating a weight with each character code of a plurality of character codes corresponding to respective alphanumeric characters of a language, wherein associating a weight includes determining a frequency with which an alphanumeric character is used in the language thereof and assigning the weight based at least on the determined frequency, wherein each character code of the plurality of character codes uniquely corresponds in a one-to-one relationship to an alphanumeric character of a character set representing a plurality of alphanumeric characters of a plurality of languages, wherein each of the plurality of character codes represents an alphanumeric character associated with a different language, and wherein the character codes associated with each language of the plurality of languages are arranged as respectively contiguous ranges of numbers to enable the identification of a language to which an alphanumeric character belongs upon the identification of one of the plurality of character codes representing the alphanumeric character;
selecting character codes from the plurality of character codes for association with respective rows of a plurality of rows of a table;
storing the selected character codes and associated weights in the table with each row of the table storing a character code and associated weight;
identifying character codes of the selected character codes for display on buttons of a jump bar of a contact manager; and
displaying the alphanumeric characters corresponding to the identified character codes on respective buttons of the jump bar, wherein the jump bar comprises a button data table including a plurality of rows comprising at least the plurality of character codes for the plurality of alphanumeric characters, the plurality of rows equal to a maximum number of the buttons displayable in the jump bar, wherein each of the buttons of the jump bar is associated with two alphanumeric characters of a first language and simultaneously associated with two alphanumeric characters of at least a second language, wherein the first language is different from the second language.

17. The method of claim 16, wherein the step of selecting character codes includes selecting character codes from the plurality of character codes based at least in part on the weights associated with the character codes.

18. The method of claim 17, wherein the selected character codes have associated weights which are greater than the associated weights of other character codes of the plurality of character codes.

19. The method of claim 16, wherein the step of identifying character codes includes identifying character codes based at least in part on the weights associated with the character codes and the number of buttons displayable on the jump bar of the contact manager.

20. The method of claim 16, wherein the character set includes the Unicode character set.

* * * * *